United States Patent [19]

Blevins et al.

[11] 4,117,261

[45] Sep. 26, 1978

[54] INSULATING STAND-OFF AND METHOD OF ASSEMBLING SAME

[75] Inventors: Gerald Glen Blevins, Edmonds; William Lewis Dumar, Jr., Bellevue; Steven Royal Hansen, Alderwood Manor; Wayne Ellory Hixson, Seattle, all of Wash.; John Edward Krezak, Swarthmore, Pa.

[73] Assignee: The Boeing Company, Seattle, Wash.

[21] Appl. No.: 702,782

[22] Filed: Jul. 6, 1976

[51] Int. Cl.² ........................................... H01B 17/16
[52] U.S. Cl. ..................... 174/164; 29/511; 29/522 A; 29/631; 85/37; 174/166 S; 174/168; 403/242
[58] Field of Search ............... 174/151, 153 R, 158 R, 174/163 R, 164, 165, 166 R, 166 S, 168, 169, 176, 177, 186, 188, 194; 339/125 R, 129, 130 R, 131 R, 198 R, 220 R; 248/231.1, 314; 85/37; 151/38; 29/511, 631; 403/193, 242

[56] References Cited

U.S. PATENT DOCUMENTS

| 913,419 | 2/1909 | Moran | 174/188 X |
| 1,029,104 | 6/1912 | Clark | 29/511 X |
| 2,785,219 | 3/1957 | Rudner | 174/166 S |
| 2,899,486 | 8/1959 | Abrams | 174/166 S |
| 2,958,070 | 10/1960 | Brewer et al. | 339/198 R UX |
| 3,056,443 | 10/1962 | Knocke | 151/38 |
| 3,935,378 | 1/1976 | Heyden | 174/158 R |

FOREIGN PATENT DOCUMENTS

| 885,143 | 5/1943 | France | 174/158 R |
| 7,410 | 10/1893 | Switzerland | 174/164 |
| 199,891 | 11/1938 | Switzerland | 174/177 |
| 185,250 | 1/1937 | Switzerland | 174/188 |
| 699,115 | 10/1953 | United Kingdom | 174/163 R |
| 1,186,760 | 4/1970 | United Kingdom | 85/37 |

*Primary Examiner*—Laramie E. Askin
*Attorney, Agent, or Firm*—Morris A. Case; B. A. Donahue

[57] ABSTRACT

An insert of a material to be electrically and thermally insulating enters into and is joined to a socket-shaped metallic base which in turn is fastened to a structure through a hole in the structure. The base is undercut, and the hole in the structure is filled when the base is fastened to the structure. An embossed lip on the socket is deformed inwardly to attach to a shoulder on the insert when the insert is bottomed in the socket.

17 Claims, 7 Drawing Figures

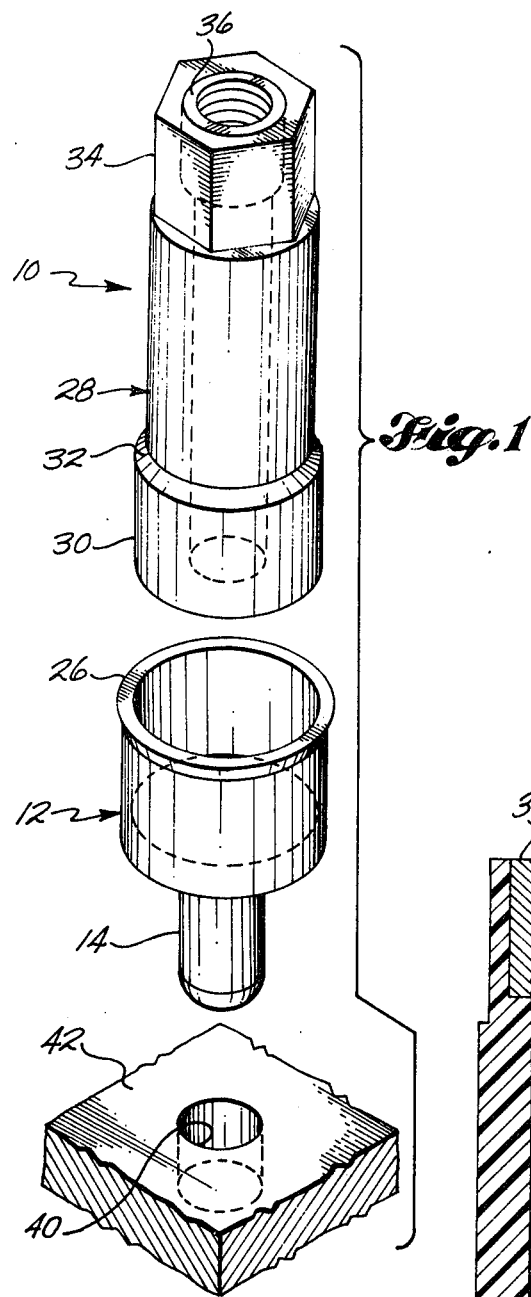
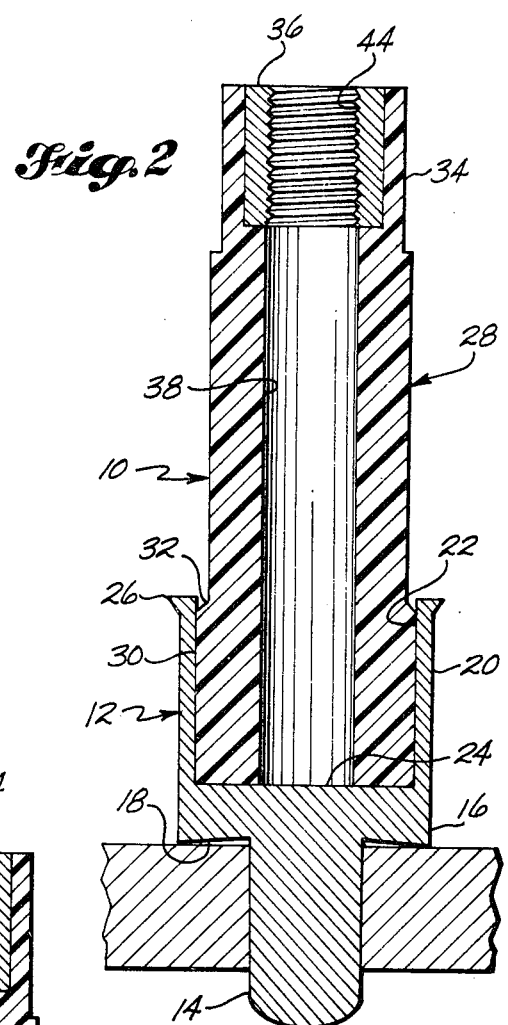
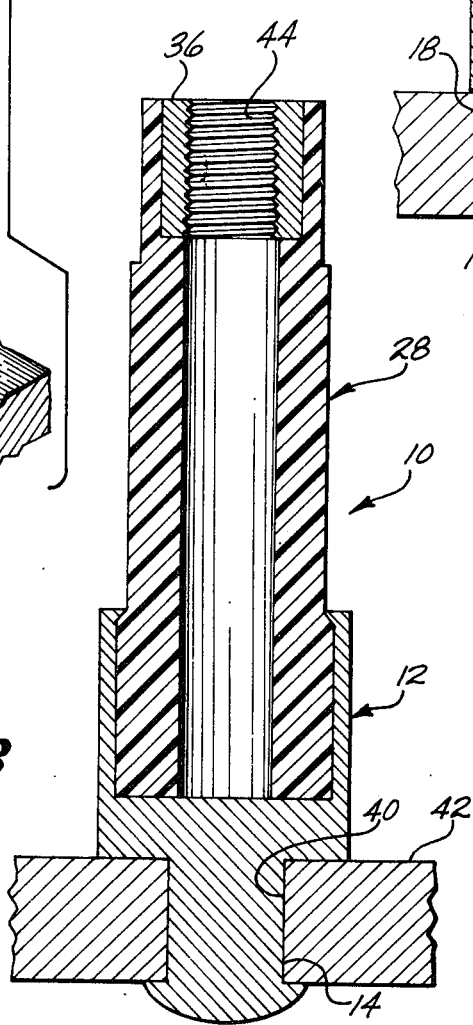

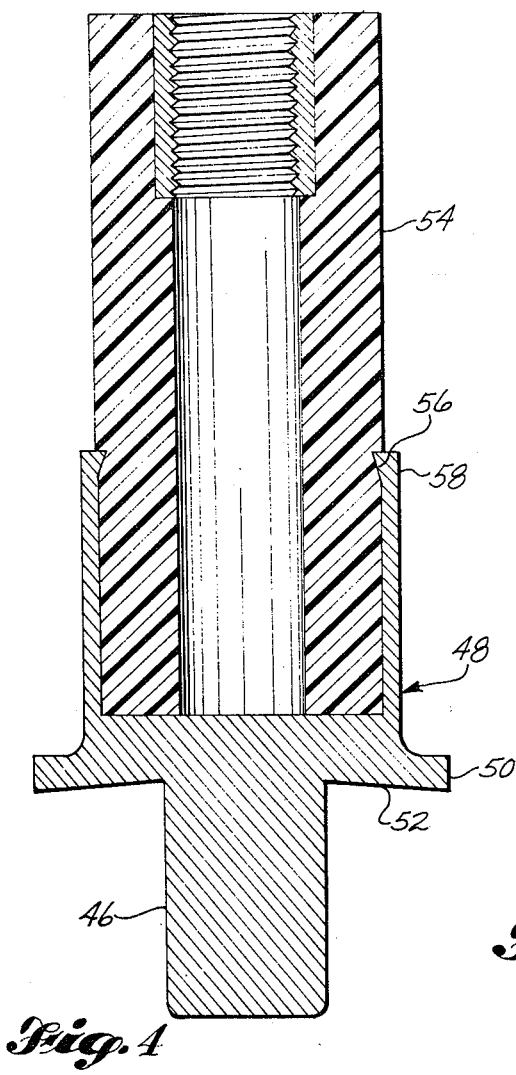
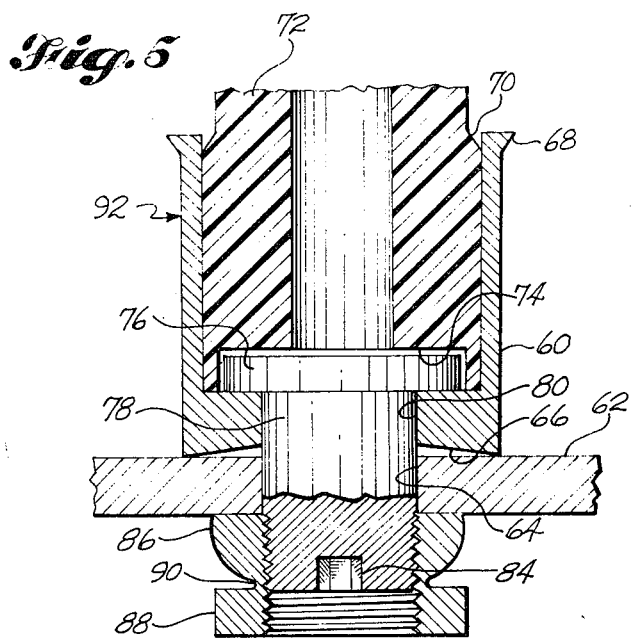
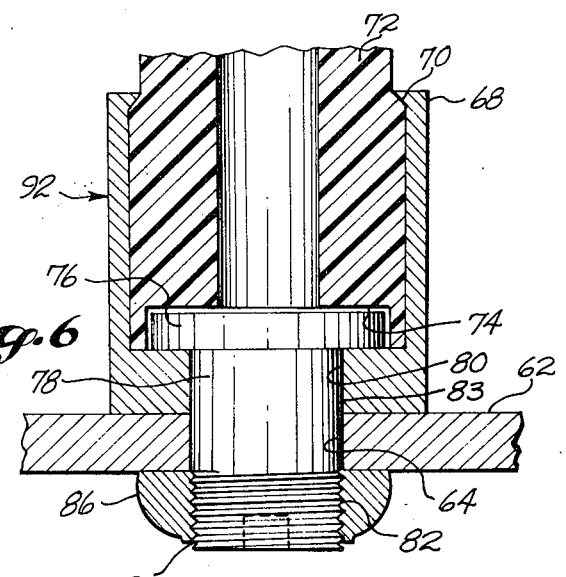
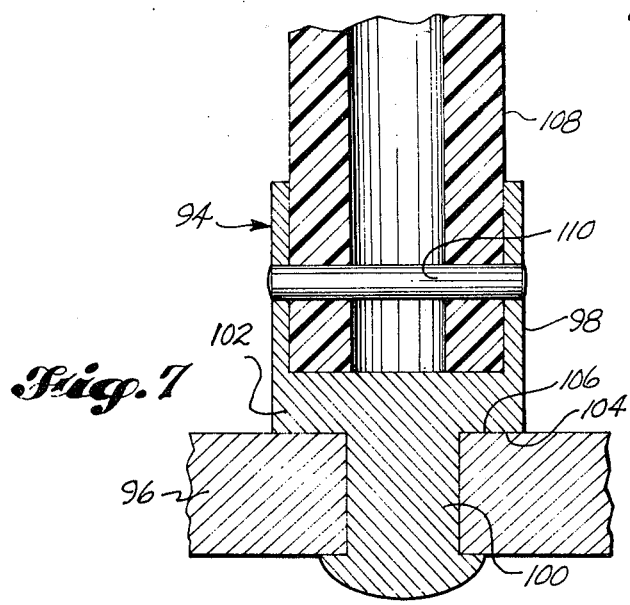

INSULATING STAND-OFF AND METHOD OF ASSEMBLING SAME

BACKGROUND OF THE INVENTION

Many wire bundles and tubing lines must be supported away from a structure with an insulative stand-off. One way of supporting those lines is by attaching a stand-off to a small sheet metal bracket which in turn is supported to the structure. The lines are then connected to the stand-off with a clamp which is bolted into the stand-off. In U.S. Pat. No. 2,785,219 to Rudner, terminals for an insulating board have a cup-shaped member threaded in the base to accept a threaded bolt for fastening diversely to the terminal board. A lip on the cup has a thin extension to permit peening the lip into a resilient insulative body inserted into the cup. The resilient body has an opening in the end away from the cup to accept and hold the shank of a terminal pin to form a stand-off directly fastened to a structure. In U.S. Pat. No. 2,726,280 and U.S. Pat. No. Re. 24,488, a stand-off terminal having an insulating body has an embedded upper terminal connector and an embedded lower fastening insert.

An insulative stand-off fastened directly to a structure was found which would accept a threaded fastener.

SUMMARY OF THE INVENTION

A socket, sized to accept a rigid insulative insert is fastened through a hole in a structural member in a manner to fill the hole. The base of the socket is undercut to provide torsional resistance. The lip of the socket has an enlarged area which is deformed inwardly by swaging or crimping or other known means onto a ledge or shoulder of the insulative insert. The shoulder is located to be contiguous to the lip of the socket when the insert is fully bottomed. In some embodiments, at least part of the insert extending outside the socket has a polygonal cross section.

It is an object of this invention to provide a single fastener insulative stand-off having torsional resistance.

DESCRIPTION OF THE DRAWINGS

FIG. 1 shows an exploded perspective view of a stand-off of this invention and a fragmented part of a structure to which the stand-off may be joined.

FIG. 2 shows a cross sectioned side elevational view of FIG. 1 with the parts of the stand-off and the structue placed together.

FIG. 3 shows the cross sectioned side elevational view of FIG. 2 with parts of the stand-off coupled together and the stand-off fastened to a structure.

FIG. 4 shows a cross sectioned side elevational view of a different embodiment of the stand-off.

FIG. 5 shows a fragmented cross sectioned side elevational view of yet another embodiment of a stand-off positioned in a structure.

FIG. 6 shows the stand-off of FIG. 5 fully coupled and also joined to the structure.

FIG. 7 shows a fragmented side elevational cross-sectioned view of yet another embodiment of a coupled stand-off joined to a structure.

DETAILED DESCRIPTION

The stand-off 10, of FIGS. 1 through 3 has a metallic base or socket 12, preferably formed as a rivet with shank 14 and a head 16, which has an inwardly extending undercut at 18, has wall or tube 20 which extends outwardly from the top of the head to form a socket area between the inside walls 22 and the top 24 of the head. The lip 26 of the socket is preferably enlarged or raised. A rigid insert 28 is made from a material that has good insulation properties; thus, it may be made from plastics such as, but not limited to, glass reinforced nylon. The lower part 30 of the insert is shaped to fit into the socket. A ledge or shoulder 32 extends around the periphery of the insert and is located to be contiguous to the lip of the socket when the insert is fully bottomed in the socket. At least part of the insert extending outside the socket is polygonal in shape and as shown at 34 in these figures, this portion is preferably hexagonal in cross section. The open end of the insert has a second internally threaded insert 36 embedded therein to accept a threaded fastener, and the insert is hollow at 38 to allow movement of the fastener.

To install the stand-off 10, a hole 40 is drilled in structural member 42, the shank 14 of the rivet is entered into the hole and the socket 12 is riveted to the structure while sufficient pressure is exerted against the riveting to tend to flatten the undercut head and to fill the hole to prevent rotational movement between the socket and the structure. Next, the insert 28 is bottomed in the socket and the enlarged or embossed lip 26 is deformed inwardly by swaging to press against the shoulder 32, to lock the insert in the socket. The swaged lip permits a fastener, not shown, to be screwed into and out of the threads 44 of the embedded insert 36 without rotational movement between the insert and the socket. The socket inside wall 22 and the lower part 30 of the insert are preferably cylindrical in shape to permit relative movement between the insert and the socket, rather than having relative movement between the socket and the structure if excessive torsional pressure is applied. One may use a tool, not shown, to be held against hexagonal portion 34 of the insert to prevent rotational movement if excessive torsional pressure becomes necessary for tightening or for loosening a fastener.

It was found, as shown in Tables 1 and 2 below, that undercutting the head of the rivet from about 2° to 4° substantially increased the torque required to cause rotation of the socket with respect to the structure with about 2° to 3° preferred.

TABLE 1

| Rivet Diameter (Inches) | Undercut Angle and Torque-Out (Inches-Pounds) | | | | | |
|---|---|---|---|---|---|---|
| | 0° | 2° | 3° | 4° | 6° | 8° |
| 3/16 | 44 | 49 | 52 | 50 | 46 | 47 |
| 3/16 | 42 | 48 | 53 | 45 | 45 | 43 |
| 3/16 | 45 | 52 | 56 | 48 | 46 | 49 |
| 3/16 | 47 | 49 | 50 | 51 | 49 | 46 |
| 7/32 | 50 | 57 | 54 | 57 | 50 | 53 |
| 7/32 | 48 | 56 | 56 | 50 | 51 | 50 |
| 7/32 | 52 | 61 | 57 | 51 | 50 | 48 |
| 7/32 | 51 | 56 | 55 | 56 | 52 | 49 |
| 7/32 | 57 | 65 | 62 | 62 | 61 | 54 |

TABLE 2

| Rivet Diameter (Inches) | Undercut Angle and Torque-Out (Inches-Pounds) | |
|---|---|---|
| | 0° | 2½° |
| ¼ | 95 | 105 |
| ¼ | 88 | 105 |
| ¼ | 90 | 110 |
| ¼ | 89 | 110 |
| ¼ | 87 | 100 |
| ¼ | 89 | 100 |

FIG. 4 is another embodiment where a rivet shank 46 is integral with a socket base 48, wherein the base has a flange 50 on the head of the rivet that extends laterally as a continuation of the undercut bottom side of the head 52. This view shows an insulating insert 54, which is notched at 56 to accept a swaged lip 58 on the socket.

FIGS. 5 and 6 are of another embodiment showing yet another method of fastening a socket 60 to a structure 62 in a manner to fill hole 64 in the structure. In these views the socket has an inwardly extending undercut base 66 and an embossed lip 68. The lip is deformed to contact a shoulder 70 on plastic insert 72. The insert has a recess 74 to give clearance for a head 76 of fastener 78; which is used to fasten the stand-off to the structure. The socket has a hole 80 through the base. To install, the threaded portion 82 of the fastener is extended through the hole in the socket and in the structure, and the shank 83 of the fastener is sized for an interference fit to fill the hole 64 in the structure when the fastener is pulled through. The fastener is held by a wrench, not shown, which is inserted into recess 84 and nut 86 having hexagonal shaped section 88 tightened to first bottom the fastener, then break off at necked down portion 90. Yet other types of known hole filling fasteners may be used in conjunction with the stand-off 92 as shown.

In FIG. 7, yet another embodiment of a stand-off 94 is shown mounted to structure 96. This stand-off uses a socket 98, having a wall preferably cylindrical in shape. This stand-off has a rivet shank 100 integral with the base 102 of the socket and in this view the undercut bottom 104 of the base has been drawn down flush with the top 106 of the structure during the riveting process. The insulative stand-off 108 is secured to the socket with a pin 110. Preferably, the pin is sized to resist the torque set up by threading or removing a fastener, not shown, into the end of the insert, but to break at a torque less than that required to cause rotational movement between the socket and the structure.

We claim:

1. An insulating stand-off comprising: a walled socket having a circular interior; an inwardly deformed embossed circular lip around the socket; the base to the socket having an inwardly extending frustoconical-shaped undercut in the bottom side of the base; means for fastening the socket, with the bottom side of the base of the socket adjacent to a structure, through a hole in the structure in a manner to fill the hole and prevent rotation of the socket with respect to the structure; a rigid insulative insert having a circular exterior end portion mated to and fully bottomed in the socket, said insert having an end extending outside the socket, said end being open and internally threaded to accept a threaded fastener; and a circular shoulder around a periphery of the insert located contiguous to and locked in by the inwardly deformed circular lip of the socket in a manner preventing relative rotation unless excessive torsional pressure is applied when the insert will rotate within the socket before the base to the socket will rotate with respect to the structure.

2. An insulating stand-off as in claim 1 wherein at least part of the end of the insert extending outside the socket is polygonal in outside cross section.

3. An insulating stand-off as in claim 2 wherein the polygonal cross section is hexagonal in shape.

4. An insulating stand-off as in claim 1 wherein the insert comprises glass reinforced nylon.

5. An insulating stand-off as in claim 1 wherein the undercut of the base of the socket is from about 2° to 4°.

6. An insulating stand-off as in claim 1 wherein the means for fastening the socket to the structure comprises a rivet shank integral to the base of the socket to extend through the hole in the structure to permit riveting to the structure.

7. An insulating stand-off as in claim 1 wherein the means for fastening the socket to the structure comprises: the base of the socket having a centered hole; a bolt extending through the hole in the base and to extend through the hole in the structure, the insert having a recess clearing a flange of the bolt positioned under the fully bottomed insert; and the bolt comprising interference means for filling the hole in the structure when the bolt is tightened.

8. An insulating stand-off comprising: a rivet with the underside of the head of the rivet having a frustoconical-shaped undercut extending inwardly to the shank; a wall extending outwardly from the top of the head and forming a socket between the wall and the top of the head the interior of said socket being circular, said wall terminating in a circular lip; an insulating rigid insert having an open end outside the socket and an opposite end having a circular external periphery fully bottomed in the socket; a circular shoulder around a perimeter of the fully bottomed insert located to be under the lip of the wall; an embossed circular portion on the circular lip of the wall with said embossed circular portion deformed inwardly and thereby contacting the circular shoulder and locking the insert in the socket in a manner preventing relative rotation unless excessive torsional pressure is applied when the insert will rotate within the socket before the head of the rivet will rotate with respect to a structure to which the rivet is fastened; and means at the open end of the insert for threadably fastening to the open end of the insert.

9. An insulating stand-off as in claim 8 wherein the head is undercut at an angle of from about 2° to 4°.

10. An insulating stand-off as in claim 9 wherein the insert comprises glass reinforced nylon.

11. An insulating stand-off as in claim 8 wherein the means for threadably fastening to the end of the insert comprises a threaded member embedded in the open end of the insert.

12. An insulating stand-off as in claim 8 wherein at least part of the insert outside the socket is polygonal in outside cross section.

13. An insulating stand-off as in claim 12 wherein the polygonal cross-section is hexagonal in shape.

14. A method of providing an insulative stand-off comprising: drilling a hole in a structural member; preparing a metallic walled socket having a circular interior, a circular embossed lip and a frustoconical-shaped undercut on the underside of the base of the socket; pressing the undercut base firmly against the structure while fastening the socket through the hole in the structure so as to fill said hole and prevent rotation of the socket with respect to the structure; bottoming a circular end portion of a rigid insulative insert into the fastened socket with said insert having a threaded open end extending outside the socket; and deforming the circular embossed lip of the socket onto a circular external shoulder of the bottomed insert in a manner thereby joining the insert to the socket and preventing relative rotation, but in response to excessive torsional pressure permitting relative rotation of the insert within the socket before the socket will rotate with respect to the structure.

15. A methd of providing an insulative stand-off with steps comprising: preparing a rivet having a head undercut adjacent a shank and an open ended tube extending from the opposite side of the head and forming a socket having a circular interior and terminating in a circular lip having an enlarged portion therearound; drilling a hole through a structure; riveting the rivet through the hole in the structure while compressing the undercut head flat against the structure; placing a circular end portion of an insulative insert fully into the socket; and swaging the enlarged circular portion around the lip onto a circular shoulder around the insert thereby locking the insert into the socket in a manner preventing relative rotation unless excessive torsional pressure is applied when the insert will rotate within the socket before the head of the rivet will rotate with respect to the structure to which the rivet is fastened.

16. An insulating stand-off comprising: a metallic cylindrical-shaped socket having a circular interior and an enlarged circular lip; a shank of a fastener extending axially downward from the base of the socket, said base having a frustoconical-shaped undercut extending inwardly and upwardly from the base outside diameter to the shank; means for joining the base of the socket to a structure with the shank extending through a hole in the structure and joined in a manner to fill the hole and prevent rotation of the socket with respect to the structure; an insulative insert with an open end extending away from the socket and having a portion of circular cylindrical shape bottomed out in the socket, said insert having a frustoconical inwardly directed circular shoulder contiguous to said enlarged circular lip of the socket, and means for accepting a threaded fastener in the open end of the insert; said enlarged circular lip of the socket wall being deformed inwardly and contacting the circular shoulder of the insert and locking the socket to the insert in a manner preventing relative rotation of the insert within the socket unless excessive torsional pressure is applied when the insert will rotate within the socket before the metallic base will rotate with respect to the structure.

17. An insulating stand-off as in claim 16 wherein a portion of the insert away from the socket is polygonal in shape.

* * * * *